June 29, 1926.

E. CARETTA

FLEXIBLE TRANSMISSION

Filed March 18, 1925

1,590,724

Inventor
E. Caretta
by Langner, Parry, Card & Langner
Att'ys

Patented June 29, 1926.

1,590,724

UNITED STATES PATENT OFFICE.

ETTORE CARETTA, OF TURIN, ITALY.

FLEXIBLE TRANSMISSION.

Application filed March 18, 1925, Serial No. 16,527, and in Italy March 24, 1924.

The present invention relates to flexible transmissions of the well known Bowden type, and comprises means for mounting and disconnecting the transmission parts with respect to members to which they are connected, and means for adjusting the length of its outer sheath, in order to obtain the best operation of the transmission under any circumstance.

Figure 1:
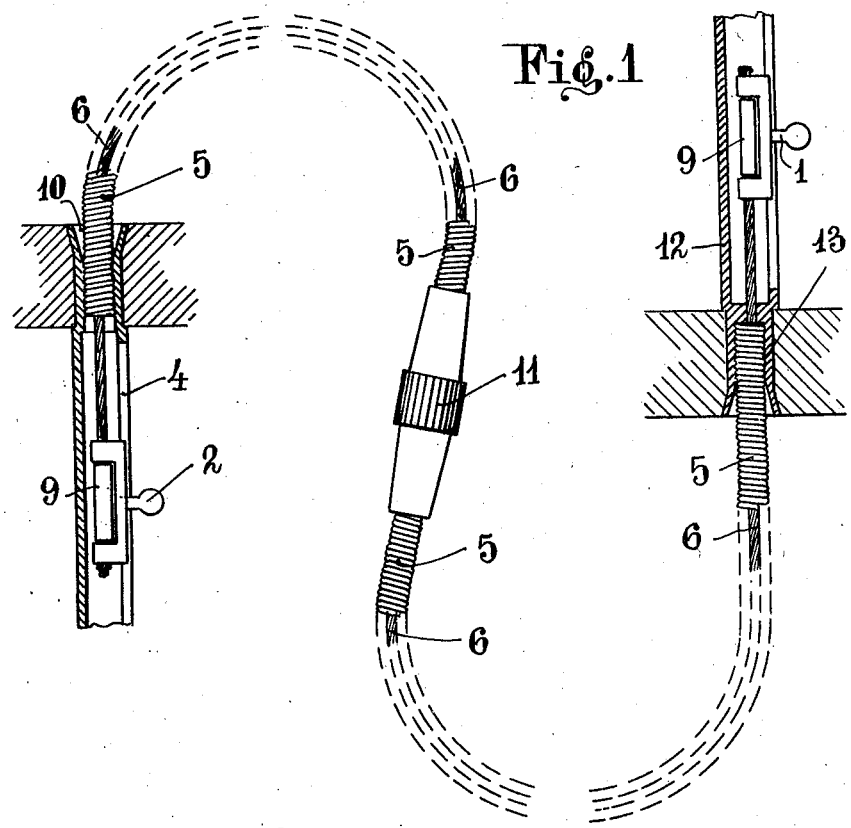
Figure 2:
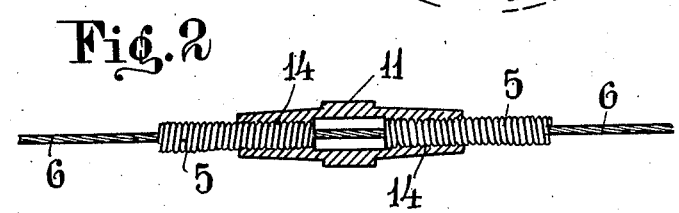
Figure 3:
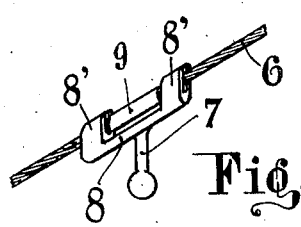
Figure 4:
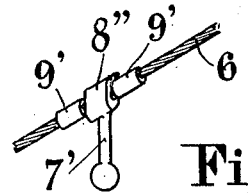

On the annexed drawing is shown by way of example an embodiment of this invention, and Figure 1 shows a transmission with intermediate portions in dotted lines, Figure 2 is a central section of the device for adjusting the length of the outer sheath, Figure 3 shows separately in perspective view means for connecting the inner transmission cord with a member to be attached thereto, and Figure 4 shows a modified construction.

As shown in Figure 1, in which the transmission is assumed to be operated by a controlling member 1 reciprocable in a stationary guide member 12 and to drive a part 2 mounted to reciprocate in a stationary guide member 4, the transmission comprises a sheath 5 consisting as usually of a metal wire coil in which is located a flexible cord 6.

According to the present invention each end of the cord 6 is connected with parts intended to control it or to be shifted thereby, respectively, by means of a fork engaging a shoulder of said cord and leaving the said cord free to rotate around its own axis with respect to said fork and the member connected with it, the cord being thus prevented from receiving torsional stresses which would make hard the actuation of the parts.

A construction of said engaging device is shown in Figure 3 where the movable member 7 provides a yoke 8 having two strap-shaped ends 8'—8' which straps embrace the cord 6 while leaving it free to rotate, and a sleeve 9 fastened on said cord intermediate said straps 8'—8' and engaged between them longitudinally.

The cord 6 is thus engaged in longitudinal direction with the member 7 while it is free to rotate with respect to it.

In the embodiment of Figure 4 the engaging device comprises a single fork member 8" provided on the movable member 7, said fork loosely embracing the cord and being engaged therewith in longitudinal direction by means of two shoulders 9'—9' fastened on said cord 6.

In any case the cord 6, shoulders 9 or 9' and sheath bore will have such a respective size as to permit for freely removing the cord 6 from its sheath by withdrawing it longitudinally therefrom.

The sheath is connected with the stationary parts 4—12 of the transmission by providing in the bore of said parts a screw thread 13 corresponding with the coil of the wire providing said sheath and the ends of said sheath are screwed in said bores; thus is avoided the provision of attaching fittings at the ends of said sheath, which would impair the flexibility of the sheath on account of their own rigidity.

The said bores are preferably flaring or tapering outwardly as shown at 10, in order to permit the sheath 5 of moving freely at the points where it extends into said stationary member without scraping against sharp edges which would affect it.

The length of the sheath is adjusted by the device shown in section in Figure 2, said device comprising a sleeve 11 having in its bore two opposite screw threads 14 adapted to be screwed on the sheath coil; in combination with said sleeve 11 two sheath sections are used which have reverse pitches to provide coils or screw threaded surfaces of reverse pitch in their adjoining ends. Thus by rotating the said sleeve the ends of the sheath sections are caused to approach or move away with respect to each other and the length of the entire sheath may be adjusted according to circumstances.

The sheath sections could also be coiled with pitches having the same direction and then the said sections may have their ends engaged in a sleeve with a screwthreaded bore having a pitch of uniform direction, the adjustment being in this case effected by rotating each section to cause it to enter or come off more or less with respect to said sleeve.

With the described construction the transmission elements are all independent from each other and thus the mounting and removal of the parts as well as their adjustment is made easy.

For removing the parts it is sufficient to unscrew one of the sheath sections from the members in which it is engaged; then the yoke 7 of one of the members attached to the cord 6 is removed therefrom and the cord is thus free to be withdrawn from its sheath.

The parts are mounted together in operative condition by proceeding in reverse manner and the sheath length is easily adjusted by the described arrangement.

What I claim as my invention and desire to secure by United States Letters Patent is:—

1. A flexible transmission comprising an inner flexible cord, sections of a wire coil sheath embracing said cord, means for fastening the ends of said sheath sections on stationary parts, means for adjusting the total sheath length and means for engaging said cord with parts to be connected therewith said engaging means providing for the free respective rotation of said cord and members connected therewith and comprising parts carried by said members freely embracing said cords and abutment parts fastened on said cord to engage said embracing parts in the direction of the cord length.

2. A flexible transmission comprising an inner flexible cord, sections of a wire coil sheath embracing said cord, means for fastening the ends of said sheath sections on stationary parts, means for adjusting the total sheath length and means for engaging said cord with parts to be connected therewith said engaging means providing for the free respective rotation of said cord and members connected therewith and comprising parts carried by said members freely embracing said cords and abutment parts fastened on said cord to engage said embracing parts in the direction of the cord length, said abutment parts having a smaller diameter than the bore of said sheath.

3. A flexible transmission comprising an inner flexible cord, sections of a wire coil sheath embracing said cord, means for fastening the ends of said sheath sections on stationary parts, means for adjusting the total sheath length, a sleeve fastened on said cord, a member to be connected with said cord and parts on said member loosely embracing said cord and abutting on the ends of said sleeve.

4. A flexible transmission comprising an inner flexible cord, sections of a wire coil sheath embracing said cord, means for fastening the ends of said sheath sections on stationary parts, means for engaging said cord with members to be connected therewith and providing for the free respective rotation of said cord and members, and means for adjusting the total length of said sheath said means comprising a part having a screw threaded bore adapted to engage the ends of said sheath sections.

5. A flexible transmission comprising an inner flexible cord, sections of a wire coil sheath embracing said cord, means for fastening the ends of said sheath sections on stationary parts, means for engaging said cord with members to be connected therewith and providing for the free respective rotation of said cord and members, and means for adjusting the total length of said sheath said means comprising a part having a screw threaded bore comprising reversely threaded portions at its ends to engage reverse coil surfaces of said sheath sections.

6. A flexible transmission comprising an inner flexible cord, sections of a wire coil sheath embracing said cord, means for fastening the ends of said sheath sections on stationary parts said means comprising a part having a screw threaded bore adapted to engage the end of a sheath section and engage its coiled surface, means for adjusting the total sheath length and means for engaging said cord with members to be connected therewith and providing for the free respective rotation of said cord and members.

7. A flexible transmission comprising an inner flexible cord, sections of a wire coil sheath embracing said cord, means for fastening the ends of said sheath sections on stationary parts said means comprising a part having a screw threaded bore adapted to engage the end of a sheath section and having an outwardly flaring mouth, means for adjusting the total sheath length and means for engaging said cord with members to be connected therewith and providing for the free respective rotation of said cord and members.

In testimony whereof I have signed my name to this specification.

ETTORE CARETTA.